(12) United States Patent
Ardizzone

(10) Patent No.: US 8,419,836 B2
(45) Date of Patent: Apr. 16, 2013

(54) GAS-LIQUID SEPARATOR AND RELATED METHODS

(75) Inventor: Leonard Ardizzone, Loveland, OH (US)

(73) Assignee: Hydrotech, Inc., Cincinnati, OH (US)

( * ) Notice: Subject to any disclaimer, the term of this patent is extended or adjusted under 35 U.S.C. 154(b) by 221 days.

(21) Appl. No.: 13/020,317

(22) Filed: Feb. 3, 2011

(65) Prior Publication Data
US 2011/0197764 A1    Aug. 18, 2011

Related U.S. Application Data

(60) Provisional application No. 61/304,139, filed on Feb. 12, 2010.

(51) Int. Cl.
*B01D 45/00* (2006.01)

(52) U.S. Cl.
USPC .......... 95/272; 55/442; 55/443; 55/444; 55/445; 55/446; 55/385.1; 55/DIG. 18; 55/DIG. 37

(58) Field of Classification Search ............ 55/442–446, 55/DIG. 18, DIG. 37, 385.1
See application file for complete search history.

(56) References Cited

U.S. PATENT DOCUMENTS

| | | | | |
|---|---|---|---|---|
| 1,519,428 | A * | 12/1924 | Wilisch | 96/299 |
| 4,478,718 | A * | 10/1984 | Saget | 210/512.3 |
| 4,897,206 | A | 1/1990 | Castelli | |
| 6,770,121 | B1 * | 8/2004 | Sindel | 95/267 |

OTHER PUBLICATIONS

Facet International, Inc., A Subsidiary of Purolator Products Company, Engineering Clear Solutions for Environmental Clean-Up, Coalescing Plate Separators: MAS Series, Brochure, 1994 (8 pages).
Facet International, Inc., Coalescing Plate Separators General Description, Brochure, 1994 (2 pages).
Facet International, Inc., MPak Coalescing Plates, Brochure, 1995 (1 page).
ENPRO, Division of Hydrotech, Inc., Tramp Oil Coolant Separator (TOCS), Brochure, 1999 (2 pages).
ENPRO, Division of Hydrotech, Inc., Increased Machine Tool Productivity Resulting From Dirt/Tramp Oil Coolant Separator, Report, May 2002 (12 pages).
Donaldson Company, Inc., Torit, Mini-Mist Collectors, Models MM 500 and MM 1200, Brochure, 2002 (2 pages).
Patricia L. Smith, The 10 Commandments of Dry High-Speed Machining, Report, May 1, 1998 (5 pages).

(Continued)

*Primary Examiner* — Jason M Greene
*Assistant Examiner* — Dung H Bui
(74) *Attorney, Agent, or Firm* — Wood, Herron & Evans, LLP

(57) ABSTRACT

An apparatus is provided for separating a liquid from a gas-liquid mixture. The apparatus has an enclosure having an inlet and an outlet defining a flow path for the gas-liquid mixture. The apparatus includes a plurality of plates in the enclosure that are arranged in the flow path between the inlet and outlet, with the plates being configured to coalesce liquid from the gas-liquid mixture contacting the plates. A reservoir may be in fluid communication with the plates and be positioned to receive fluid coalesced by the plates. The plates may be arranged so as to create a turbulent flow of the gas-liquid mixture flowing from the inlet toward the outlet.

23 Claims, 7 Drawing Sheets

OTHER PUBLICATIONS

NIOSH Manual of Analytical Methods (NMAM), Metalworking Fluids (MWF) All Categories, Method 5524, Issue 1, Fourth Edition, Mar. 15, 2003 (10 pages).

Dropsa SpA, MKD-Dual Minimal Lubrication for Near Dry-Working Systems, User and Maintenance Manual, Warranty, Dec. 2003 (12 pages).

Cutting Tool Engineering, by Greg Landgraf, Associate Editor, Dry Goods, Factors to Consider When Dry or Near-Dry Machining, Magazine, vol. 56, No. 1, Jan. 2004 (5 pages).

American Machinist, by Jim Benes, Associate Editor, Tooling, Cutting the Coolant, Reducing-Or Eliminating-Coolant Has Economic and Performance Benefits, Magazine, Jul./Aug. 2007 (5 pages).

* cited by examiner

GAS-LIQUID SEPARATOR AND RELATED METHODS

CROSS-REFERENCE TO RELATED APPLICATION

This application claims the filing date benefit of U.S. Provisional Application No. 61/304,139, filed Feb. 12, 2010, the disclosure of which is hereby incorporated by reference herein in its entirety.

TECHNICAL FIELD

This invention relates generally to gas-liquid separators and, more particularly, to an apparatus and method for separating a lubricating liquid, such as oil or liquid coolant, from a mist or mixture of such lubricating liquid and air.

BACKGROUND

In metal working it is sometimes desirable to provide lubrication to an interface between a metal working tool, such as a drill or a lathe, and a working piece. One type of lubrication process is known as "wet machining" and includes flooding an interface between a metal working tool and a workpiece with a liquid lubricant, such as oil or coolant. This type of lubrication process results in lubricant being entrained in the air surrounding the interface. Another type of lubrication process is known as "dry machining," and includes the supply of a mixture or mist of oil suspended in air or a mixture or mist of a liquid coolant suspended in air directed to the tool/workpiece interface. Exposure, in a working environment, to the airborne lubricant resulting from wet machining or dry machining, however, may present health hazards. In this regard, agencies such as the National Institute for Occupational Safety and Health (NIOSH) and the Occupational Safety and Health Administration (OSHA) have developed standards that limit the concentration of airborne liquid lubricants such as oil or coolant, to which a person in an industrial environment may be exposed, to about 5 mg/m$^3$. To this end, it is known to place the lubricated interface between the metal working tool and the workpiece within an enclosure or "doghouse."

Once the liquid lubricant-containing mist or mixture has been used and/or a metal working project has been completed, the residual mixture of air and airborne lubricant in the doghouse must be processed so that the lubricant (e.g., oil or coolant) concentration can be reduced to an acceptable level and thus made to comply with the required standards set by NIOSH and OSHA. To this end, conventional systems include directing a stream of the lubricating mixture leaving the doghouse through a device having disposable media such as filters or cartridges. A challenge with such devices, however, is the required timely replacement of the disposable media. More specifically, if such media are not replaced when required, the efficacy of the device in reducing the lubricant content is affected, resulting in air flowing into the machine shop or similar space where the doghouse is located that has a higher-than-desired lubricant content.

Moreover, the disposal of consumable, lubricant-filled media from such devices is inconvenient, insofar as the disposal of such media may require compliance with pollution-control procedures. Finally, operation of such devices results in ongoing operational costs. For example, there are costs directly associated with the required purchase of replacement media (e.g., filters, cartridges), costs associated with the downtime and labor required to replace such media, and costs associated with replacing the lubricant (e.g., oil, liquid coolant) used up by the supply of the lubricating mist or mixture.

It would be desirable, accordingly, to provide an apparatus and related methods that address these and other problems associated with conventional devices designed for such purpose.

SUMMARY

The present invention overcomes the foregoing and other shortcomings and drawbacks of known gas-liquid separators. While the invention will be described in connection with certain embodiments, it will be understood that the invention is not limited to these embodiments. On the contrary, the invention includes all alternatives, modifications and equivalents as may be included within the spirit and scope of the present invention.

In one embodiment, an apparatus is provided for separating a liquid from a gas-liquid mixture. The apparatus has an enclosure having an inlet and an outlet defining a flow path for the gas-liquid mixture between the inlet and outlet. The apparatus includes a plurality of stacked plates in the enclosure that are arranged in the flow path between the inlet and outlet, with the plates being configured to coalesce liquid (e.g., droplets) from the gas-liquid mixture contacting the plates. A reservoir may be in fluid communication with the plates and be positioned to receive fluid coalesced by the plates. The plates may be arranged so as to create a turbulent flow of the gas-liquid mixture flowing from the inlet toward the outlet. Additionally or alternatively, the plates may be configured to coalesce oil captured by engagement of the plates with an air-oil mixture flowing from the inlet toward the outlet. The plates, in a specific embodiment, include a plurality of ports for directing liquid coalesced by the plates into the optional reservoir of the apparatus. The plates may be arranged so as that the gas-liquid mixture flows over respective surfaces of the plates in a generally sinusoidal flow profile.

The apparatus may include a plurality of spacers that separate adjacent pairs of the plates. The enclosure may include an evacuation port that is in communication with the optional reservoir for evacuating liquid from that reservoir. Each of the plates may have a generally horizontal orientation along its length and include bidirectional corrugations that extend along the length of the plate and in a direction that is transverse to the length of the plate. In a specific embodiment, the plates are made of polypropylene. Additionally or alternatively, each of the plates may have an oleophilic surface.

The apparatus may include an air-forcing device that is in fluid communication with the outlet for drawing the gas-liquid mixture from the inlet to the outlet. The enclosure, in a specific embodiment, includes a pair of sidewalls, and the apparatus also includes a pair of side seals that contact the plates and which are spaced from the sidewalls, as well as a pair of vertically-extending barriers proximate the inlet, such that the side seals cooperate with the barriers to direct flow of the gas-liquid mixture between the plates. The apparatus may additionally or alternatively include a pair of undulated baffles that engage the side seals and the sidewalls for restricting lateral movement of the plates within the enclosure. The enclosure may additionally include a pair of front gaskets that cooperate with the side seals to direct flow of the gas-liquid mixture between the plates. In a specific embodiment, the apparatus includes a deflector proximate the inlet for creating a turbulent flow of the gas-liquid mixture flowing between the inlet and the outlet.

In another embodiment, a system is provided for providing lubrication to a metal working operation. The system includes a first enclosure that has a metal-working tool in an interior of the first enclosure. The system also includes a supply of lubricating gas-liquid mixture that is in fluid communication with the interior of the first enclosure and which is configured to provide the gas-liquid mixture to a working interface of the metal-working tool. A second enclosure is in fluid communication with the first enclosure and has an inlet to receive the gas-liquid mixture from the first enclosure. The inlet and an outlet of the second enclosure define a flow path for the gas-liquid mixture between the inlet and outlet. A plurality of plates in the second enclosure is arranged in the flow path between the inlet and outlet, and is configured to coalesce liquid from the gas-liquid mixture contacting the plates. The system may also include a reservoir that is in fluid communication with the plates and which is positioned to receive liquid coalesced by the plates. In a specific embodiment, the reservoir is in fluid communication with the supply of lubricating gas-liquid mixture for recycling of liquid collected in the reservoir.

In yet another embodiment, a method is provided for separating a liquid from a gas-liquid mixture. The method includes forcing a stream of the gas-liquid mixture into an enclosure, and directing the stream between a plurality of stacked plates within the enclosure to thereby coalesce liquid from the gas-liquid mixture. The method also includes evacuating substantially liquid-free gas from the enclosure. The method may include forcing a stream of an air-oil mixture into the enclosure and evacuating substantially oil-free air from the enclosure. Additionally or alternatively, the method may include disrupting flow of the gas-liquid mixture entering the enclosure to thereby make the flow thereof turbulent. In a specific embodiment, the method includes forcing substantially all portions of the stream to flow between the stacked plates. The stream of the gas-liquid mixture may flow between the stacked plates following a generally sinusoidal profile.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate an embodiment of the invention and, together with a general description of the invention given above, and the detailed description of the embodiments given below, serve to explain the principles of the invention.

DETAILED DESCRIPTION OF THE INVENTION

Figure 1:
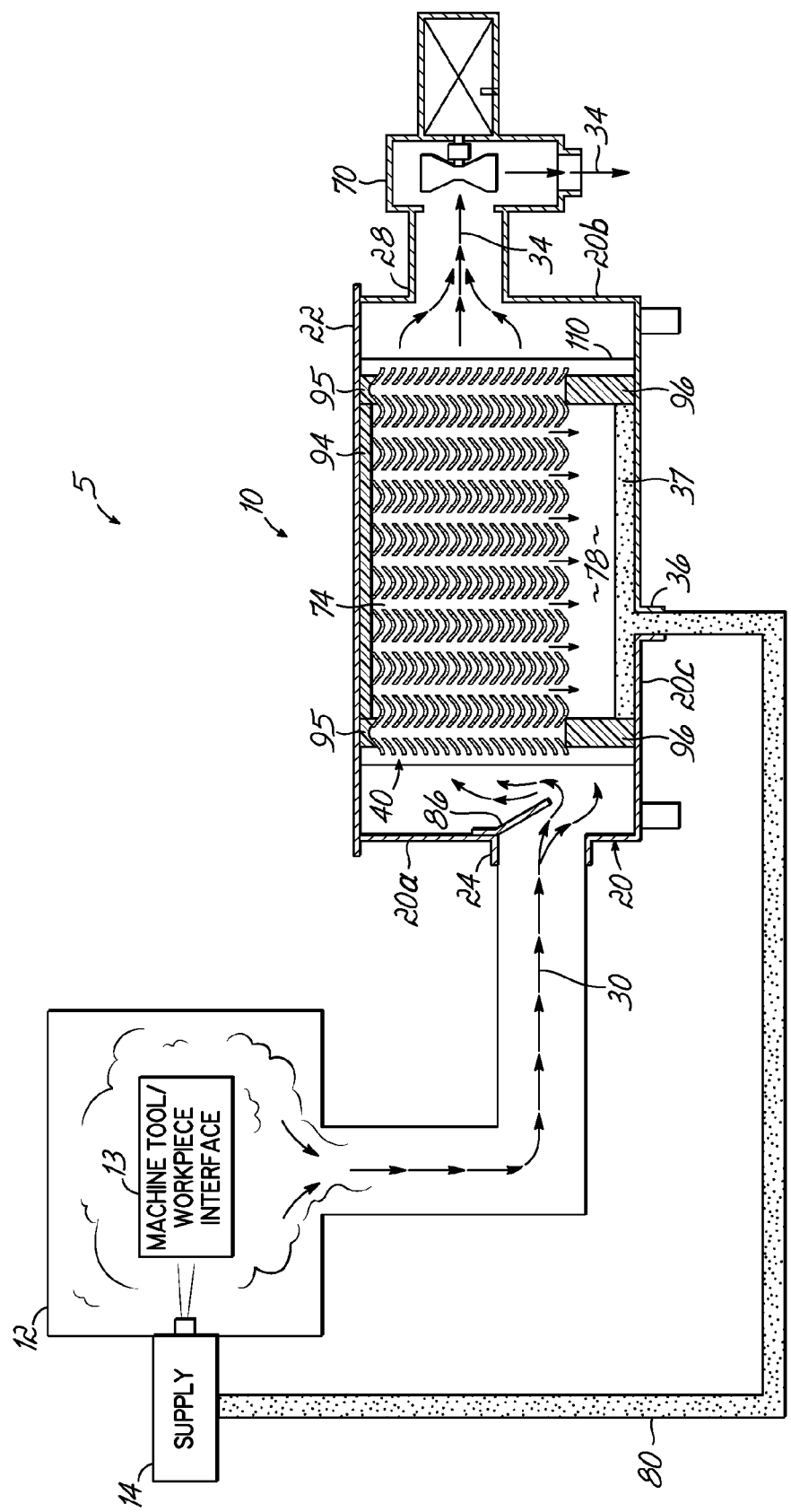
FIG. 1 is a schematic view of an exemplary system for providing lubrication to a metal working operation.

FIG. 1 is a schematic view of an exemplary system 5 for providing lubrication to a metal working operation. System 5 includes an apparatus 10 for separating a liquid from a gas-liquid mixture used in the metal working operation. In particular, the apparatus 10 may be used, for example, to separate oil from an oil-containing air stream or liquid coolant from a coolant-containing air stream used in a machine shop for lubricating metal-working operations such as drilling, milling, or cutting. For brevity of explanation, the apparatus and methods described herein refer to separation of oil from a stream 30 of an air-oil mixture, although it is understood that this is intended to be illustrative rather than limiting, and includes separation of coolant from a stream of an air-coolant mixture or other suitable working fluid entrained in a gas such as air.

The apparatus 10, in this regard, receives a stream 30 of oily mist, having oil droplets as small as 1 micron, for example, from an enclosed machine tool working volume, or "doghouse" 12 containing a metal-working tool and working piece forming a tool/workpiece interface 13, which in turn receives the stream 30 of oily mist from an oily mist supply apparatus 14. The apparatus 10 receives the residual stream 30 of oily mist from the doghouse 12, separates the oil from the air, and evacuates (i.e., outputs) substantially oil-free, clean air back into the shop in which the doghouse 12 is located. Notably, the apparatus 10 is free of disposable media (e.g., filters, cartridges), which obviates the need to replace components having a limited lifetime span, thereby reducing the operating costs relative to conventional devices. Moreover, the apparatus 10 obviates the need to dispose of used, oil-filled disposable media.

Figure 2:
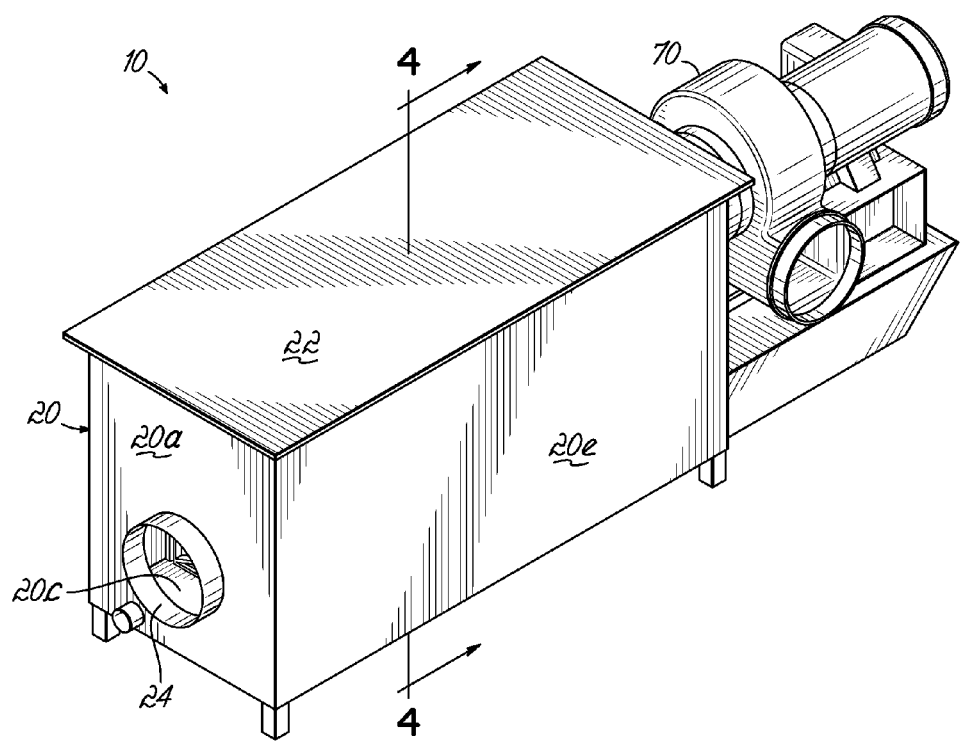
FIG. 2 is a perspective view of an apparatus forming part of the system shown in FIG. 1 for separating liquid from a gas-liquid mixture.

With continued reference to FIG. 1 and further referring to FIG. 2, apparatus 10 includes an enclosure 20 made of metal, polypropylene, or other suitable material, and which includes a top cover 22, an inlet 24, and an outlet 28 respectively disposed on front and back walls 20a, 20b of enclosure 20. The inlet 24 receives the flow of the stream 30 of the oil-air mixture into the enclosure 20, while the outlet 28 allows the flow of substantially clean air 34 out of the enclosure 20. An evacuation port 36 located, in one embodiment, on a bottom wall 20c of enclosure 20, permits the evacuation of oil 37 collected from the separation process, as explained in further detail below. The inlet 24 and outlet 28 are suitably sized for a particular application and each may have a diameter of about 6 inches, for example.

Figure 3:
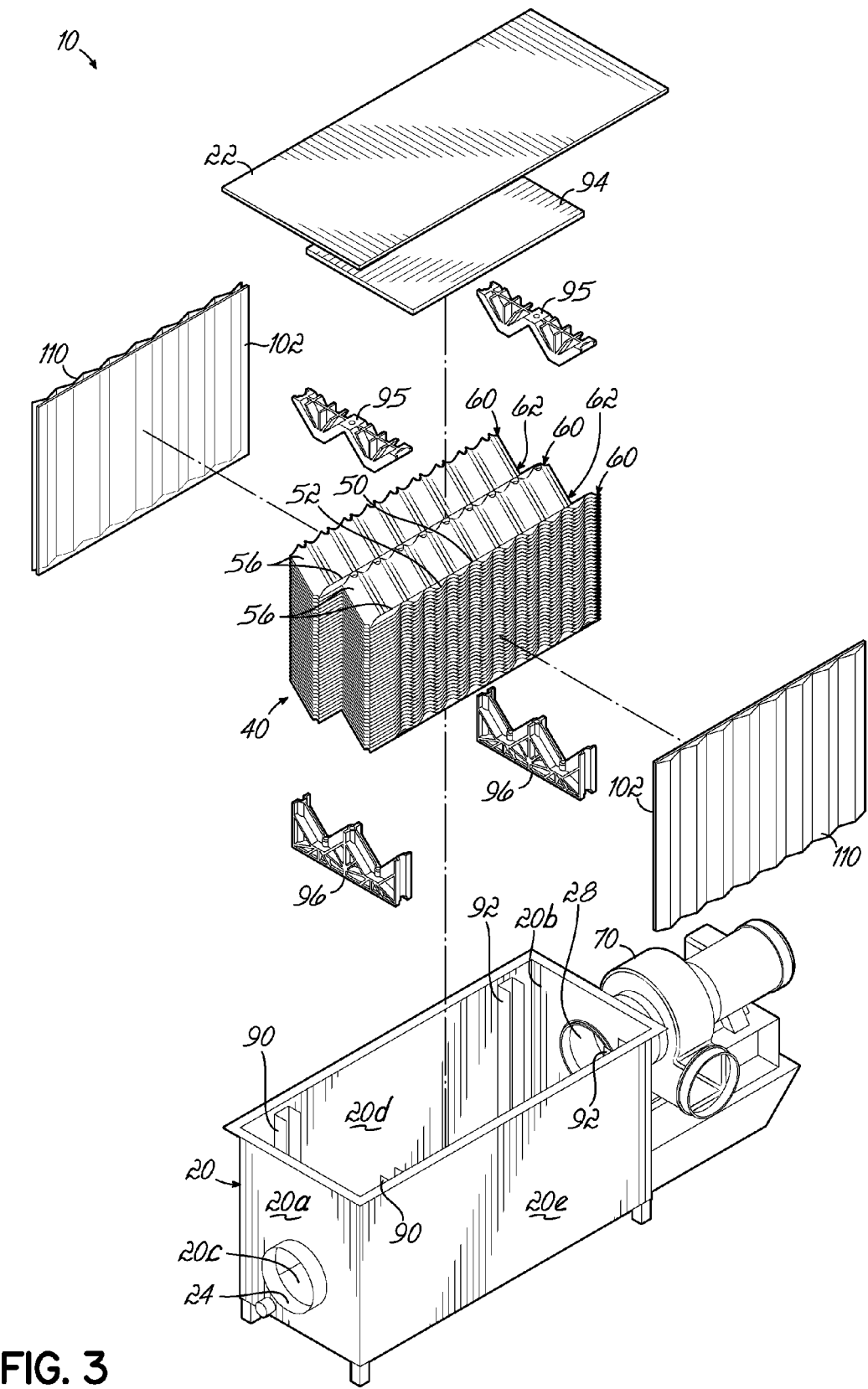
FIG. 3 is a disassembled perspective view of the apparatus of FIG. 2.
Figure 4:
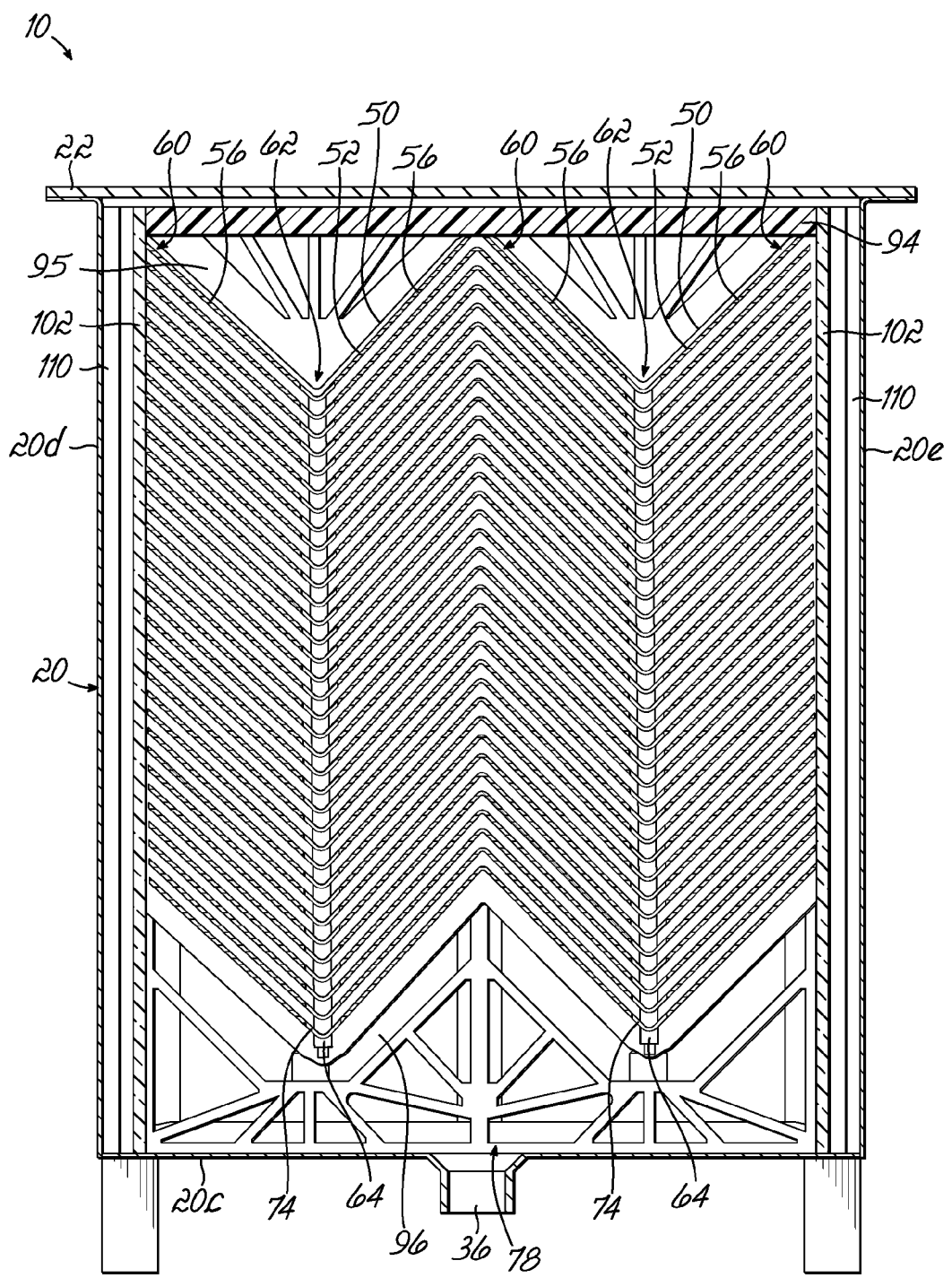
FIG. 4 is a cross-sectional view taken generally along line 4-4 of FIG. 2.
Figure 5:
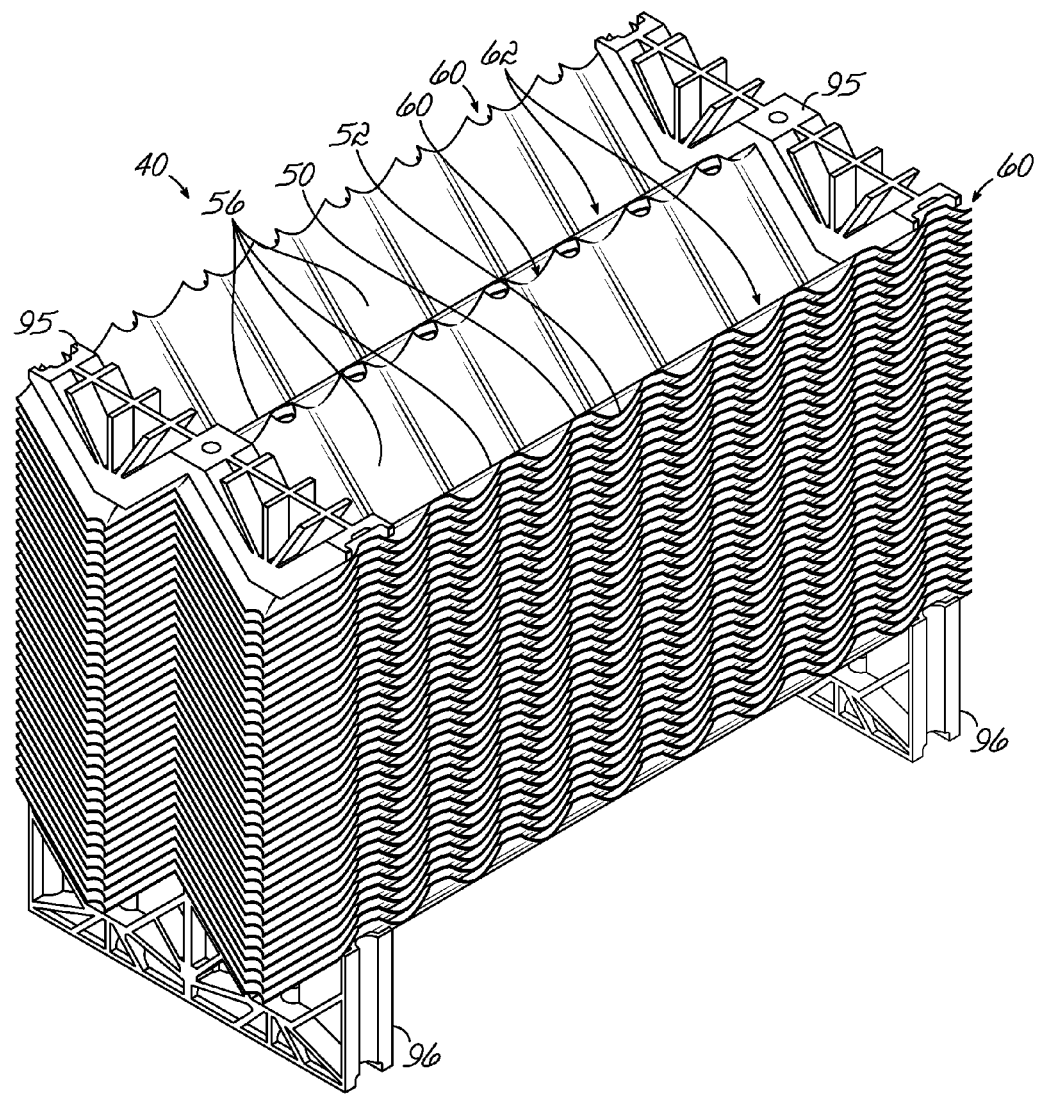
FIG. 5 is a perspective view of a plurality of stacked plates of the apparatus of FIGS. 2-4.

With continued reference to FIGS. 1-2, and further referring to FIGS. 3-5, the apparatus 10 includes a plurality of stacked plates 40 disposed within the enclosure 20, and which separate the oil 37 from the stream 30 of air-oil mixture flowing through the interior of enclosure 20. The plates 40 have a generally horizontal orientation along their length within the enclosure 20, i.e., they are generally parallel to the bottom wall 20c and are made of a suitably chosen material, such as polypropylene, or some other generally non-consumable material. The material(s) making up each of the plates 40 is/are chosen so as to facilitate coalescing of the liquid (e.g., oil 37) to be separated from the stream 30. In the illustrated embodiment, for example, the material(s) making up the plates 40 is/are chosen so as to make the surfaces of the plates 40 oleophilic, which facilitates the collection of oil when the stream 30 of air-oil mixture engages those surfaces.

Each of the plates 40 has an undulated shape with bidirectional corrugations extending along the length (i.e., the front-back dimension) and along the width of the plates 40. In this regard, each plate 40 includes a plurality of peaks 50 and valleys 52 defining a generally sinusoidal shape of the plate 40 along its length. Further, each of the plates 40 has a plurality of inclined portions 56 defining a plurality of peaks 60 and valleys 62, each extending along the length of the plates 40. The inclined portions 56 define an overall "W" profile for each of the plates 40. A plurality of spacers 64 separates the plates 40 from one another, thereby defining void spaces between them, through which the stream 30 of air-oil mixture flows. In operation, the stream 30 flows within the interior of the enclosure 20 from the inlet 24 in a general direction toward the outlet 28, with the flow being drawn by an air-forcing device 70, such as a fan or a compressor, that is fluidly coupled to the outlet 28. The stream 30 flows in the spaces between the plates 40, along the surfaces of the plates 40, with the flow following a generally sinusoidal profile corresponding to the shape of the spaces between pairs of adjacent plates 40. An exemplary stack of plates 40 suitable for use in the present invention the application herein described is disclosed in U.S. Pat. No. 4,897,206, issued to Castelli, the disclosure of which is hereby expressly incorporated herein in its entirety.

As the stream 30 engages the oleophilic surfaces of the plates 40, the oil 37 from the stream 30 is captured by the plates 40 and coalesces on the surfaces of the plates 40. The coalesced oil 37 then flows, by virtue of gravity, down the surfaces of the plates 40 and through a plurality of ports 74 disposed along the valleys 62. Oil 37 flowing through the ports 74, in turn, is collected in a reservoir 78 adjacent the bottom wall 20c and may be selectively evacuated from the interior of enclosure 20 through the evacuation port 36 for further disposition, such as recycling or disposal. For example, the oil 37 collected in reservoir 78 may be filtered and recycled back to the oily mist supply 14 through a conduit 80 (FIG. 1). As the stream 30 flows from the front portion to the back portion of the interior of enclosure 20, the oil content of the stream 30 is gradually diminished such that, when the stream 30 reaches the outlet 28, substantially clean, oil-free air leaves the enclosure 20 through outlet 28. For example, the oil content of the stream 30 leaving the enclosure 20 through outlet 28 may be about 5 mg/m$^3$ or less. An oil content of 5 mg/m$^3$ is the maximum permitted oil content of air in an industrial environment, as established by standard No. 5026 of the National Institute for Occupational Safety and Health (NIOSH) and by the Occupational Safety and Health Administration (OSHA).

With continued reference to FIGS. 1-5, coalescing of the oil 37 by engagement of the stream 30 with the plates 40 requires the flow of the stream 30 to be turbulent (i.e., eddy flow) rather than laminar. To this end, the turbulent flow is facilitated by the spaced arrangement of the plates 40, which splits the stream 30 into multiple streams, the chosen shape of the plates 40, which forces the stream 30 to flow in a generally sinusoidal flow path, as described above, and the presence of the ports 74, which is believed to disrupt the flow of the stream 30. Turbulent flow is further facilitated by the presence of a deflecting element in the form of a deflector plate 86 (FIG. 1) disposed proximate the inlet 24, within the interior of enclosure 20. More specifically, the position and orientation of the deflector plate 86 relative to the inlet 24 forces the stream 30 to flow downward and sideways around the deflector plate 86, before being forced between the stacked plates 40. This downward and sideways flow of the stream 30 disrupts the flow of stream 30 entering the enclosure 20 through the inlet 24, thereby making the flow turbulent before it reaches the plates 40.

In one aspect of apparatus 10, the same includes features preventing the flow of any portion of the stream 30 around, rather than between, the plates 40. More particularly, apparatus 10 includes a first pair of vertically-extending barriers 90 adjacent the front edges of the plates 40, and a second pair of vertically-extending barriers 92 adjacent the back edges of the plates 40, which prevent any portion of the stream 30 from flowing down the sides of the plates 40 toward the outlet 28. An upper seal 94 and a pair of (i.e., front and back) top seal gaskets 95 adjacent the upper seal 94 and top cover 22 cooperate with the barriers 90, 92 to further prevent the flow of any portion of stream 30 around the plates 40, specifically by preventing the flow of stream 30 above the upper-most plate 40, while a pair of (i.e., front and back) bottom seal gaskets 96 adjacent the bottom wall 20c prevent the flow of stream 30 below the lower-most plate 40. Ensuring that all portions of stream 30 flow along the surfaces of (and in between) the plates 40 minimizes the likelihood that any portion of stream 30 may flow through the apparatus 10 untreated, thus with a relatively high oil content.

While not shown, it is contemplated that the apparatus 10 may also include optional back-up media (e.g., polypropylene media) supported in the C-channels defined by the barriers 92, and configured to aid in the separation of oil and air from the stream 30 of air-liquid mixture. Further, while the embodiment of FIG. 3 shows the barriers 90, 92 being shaped so as to define respective C-shaped channels, those of ordinary skill in the art will readily appreciate that the shape and dimensions of those barriers 92 may be different from those shown. For example, one or both of the barriers 90, 92 may be a flat structure and thus define no channel at all.

The apparatus 10 may also include a pair of generally horizontally-extending barriers (not shown) along the bottom wall 20c defining the reservoir 78 for collecting the oil 37 separated from stream 30. It is contemplated, however, that the reservoir 78 may take other forms instead, such as a standalone container separable from the bottom wall 20c, and still fall within the scope of the present disclosure. In the illustrated embodiment, for example, the reservoir 78 is defined by the volume formed between bottom wall 20c and the bottom seal gaskets 96, although this is intended to be exemplary rather than limiting.

With continued reference to FIGS. 1-5, the plates 40 are held together by a pair of side seals 102 oriented generally parallel to and spaced from sidewalls 20d, 20e of enclosure 20, and which prevent any portion of the stream 30 flowing along the surfaces of plates 40 from escaping laterally around the plates 40. Moreover, the side seals 102 are positioned relative to the vertically-extending barriers 90, 92 so that all portions of the stream 30 flowing between each pair of the barriers 90, 92 flows also between the side seals 102, thereby further ensuring that no portion of the stream 30 flows through the interior of enclosure 20 without flowing between the plates 40. The assembly jointly defined by the plates 40 and side seals 102 is secured in position within the enclosure 20 by a pair of undulating baffles 110, made of a relatively stiff material, and which are shaped to engage the side seals 102 and the sidewalls 20d, 20e, thereby generally laterally centering the plates 40 within the enclosure 20. In a variation of this embodiment, the apparatus 10 may instead include a side seal 102 and an adjacent undulating baffle 110 on one of the sides of the enclosure 20, and a different, integral structure on the opposite side. For example, and without limitation, the opposite side of the enclosure may instead have a different type of seal, such as a seal made of a synthetic rubber such as Buna-N (i.e., nitrile) rubber.

The dimensions of the various features of apparatus 10 are suitably chosen to permit the separation of a desired amount of the liquid (e.g., oil) from the stream 30 flowing through the interior of enclosure 20. For example, the length (i.e., the dimension from front to back) of the enclosure 20, the required volumetric flow rate of the stream 30 through the enclosure 20, and the number and size of the plates 40 in the enclosure, may be determined from Stoke's Law and/or from other factors. In a particular application, for example, the number of plates 40 may be in the range of about 35 to about 56, while the length of the plates 40 may be about 1 ft to 2 ft.

Other factors that are utilized in determining some of the features of apparatus 10 include the volumetric flow rate of the stream 30, which may be at least partly determined from the volume of the doghouse 12 from which the stream 30 is received. In this regard, it has been found that a doghouse volume of up to about 150 ft$^3$ requires a volumetric flow rate of about 400 ft$^3$/min of stream 30, while a doghouse volume in the range of about 151 ft$^3$ to about 250 ft$^3$ requires a volumetric flow rate of about 600 ft$^3$/min for stream 30. Likewise, it has been found that an assembly of stacked plates 40 having a width of about 1 ft and a height of about 1 ft is suitable for a doghouse volume of up to about 150 ft$^3$, while an assembly having a width of about 1 ft to about 2 ft and a height of about 1 ft to about 2 ft is suitable for a doghouse volume in the range of about 151 ft$^3$ to about 250 ft$^3$.

In other aspects of apparatus 10, the motor (not shown) driving the air-forcing device (i.e., fan or compressor 70) in fluid communication with the outlet 28 is suitably chosen for the particular application. In this regard, for example, the motor may be of a type requiring a single phase or three-phase power supply with a frequency of 50 or 60 Hz, and a voltage of 230 or 460 V.

Figure 6:
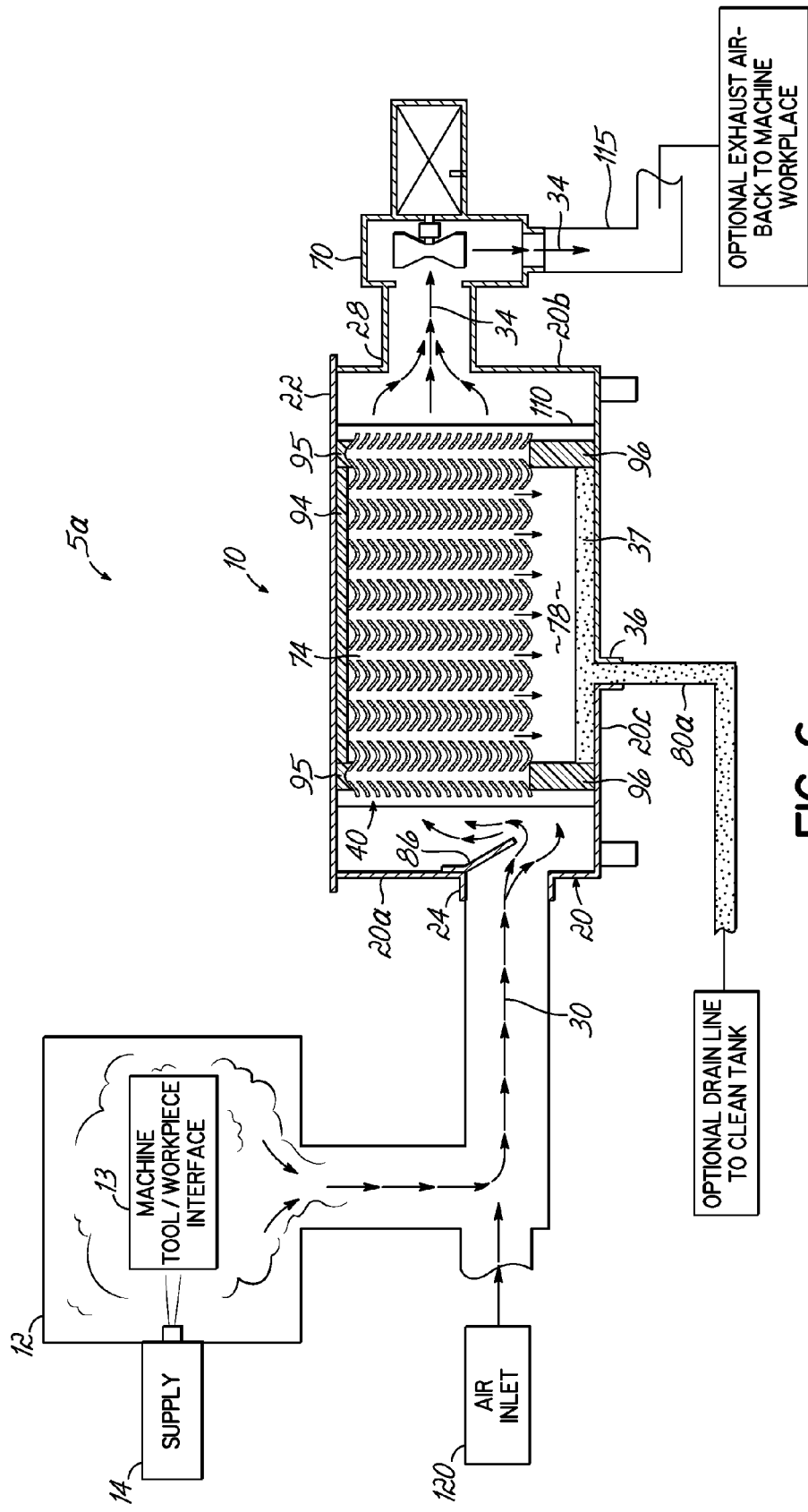
FIG. 6 is a schematic view similar to FIG. 1 illustrating another embodiment of a system for providing lubrication to a metal working operation.

Referring now to FIG. 6, that figure illustrates another embodiment of a system 5a for providing lubrication to a metal working operation. For ease of understanding, like reference numerals in that figure refer to similar features in any of the preceding figures, the description of which may be referred to for an understanding of the embodiment of FIG. 6 as well. System 5a includes an optional exhaust line 115 that, although not shown, may be operatively coupled to the doghouse 12 and supply substantially clean air 34 to the doghouse 12. In a variation of that embodiment, the substantially clean air 34 may be fed to the doghouse 12 through an optional inlet 120 positioned downstream of the interface 13, and aiding the feeding of the stream 30 of air-oil mixture toward the enclosure 20.

It is contemplated that all the air used in the stream 30 of air-oil mixture may be provided through the optional inlet 120. Alternatively, however, it is also contemplated that additional sources of clean air may be present that provide air to define the stream 30 of air-oil mixture being fed through the apparatus 10. In another aspect of the system 5a, that embodiment illustrates an optional drain line 80a that is used to selectively drain the reservoir 78 of enclosure 20 during maintenance or cleaning operations. It is contemplated that the optional drain line 80a may be present in addition to or instead of the conduit 80 (FIG. 1), and still fall within the scope of the present disclosure.

Figure 7:
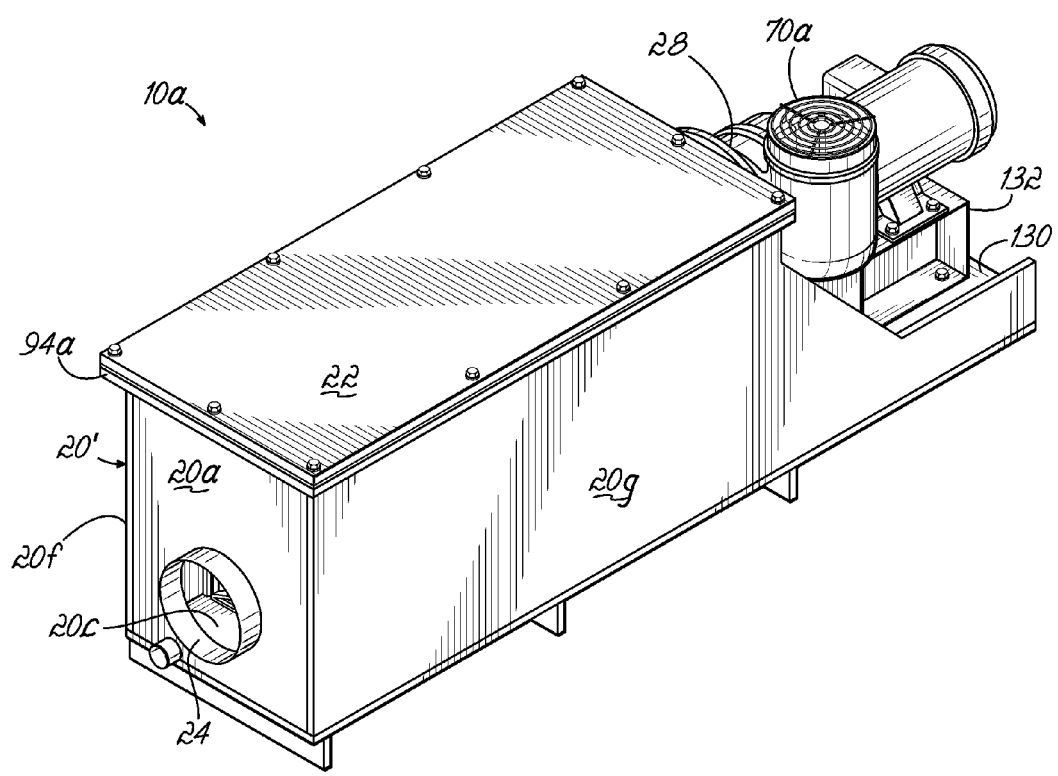
FIG. 7 is a perspective view of an apparatus forming part of the system shown in FIG. 7 for separating liquid from a gas-liquid mixture.

With reference to FIG. 7, in which like reference numerals refer to similar features in the preceding figures, that figure illustrates another embodiment of an apparatus 10a for separating a liquid from a gas-liquid mixture used in metal working operations. Apparatus 10a is similar in most respects to the apparatus 10 (FIGS. 1-4) but includes an air-forcing device 70a, such as a fan or a compressor, having a location and orientation different to those of air-forcing device 70 of apparatus 10 (FIGS. 1 and 2). Apparatus 10a also includes an upper seal 94a, similar to upper seal 94 (FIG. 3) but extending to the same dimensions as those of the top cover 22, rather than being smaller than the top cover 22, as in the embodiment of FIG. 3.

In another aspect of the embodiment of FIG. 7, the apparatus 10a has an enclosure 20' having respective sidewalls 20f, 20g that have elongated bottom portions so as to define a ledge 130 of the apparatus 10a. The ledge 130 provides a surface that is configured to support the air-forcing device 70a, and in that regard may have a height designed for a specific type of air-forcing device 70a so as to provide for alignment between the coupling portion of device 70a and the outlet 28. In one variation of this embodiment, the ledge 130 may be designed to accept one of a variety of air-forcing devices 70a and be provided instead with one or more support blocks 132 supported by the ledge 130 and in turn supporting the air-forcing device 70a.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. An apparatus for separating a liquid from a gas-liquid mixture, comprising: an enclosure having an inlet and an outlet defining a flow path for the gas-liquid mixture between said inlet and said outlet and a pair of sidewalls; a plurality of stacked plates in said enclosure and arranged in the flow path between said inlet and outlet, said plates being configured to coalesce liquid from the gas-liquid mixture contacting said plates; and a side seal located between one of said sidewalls and said plurality of stacked plates and contacting said plurality of plates.

2. The apparatus of claim 1, wherein said plates are arranged so as to create a turbulent flow of the gas-liquid mixture flowing from said inlet toward said outlet.

3. The apparatus of claim 1, wherein the gas-liquid mixture comprises a mixture of air and oil, and further wherein said plates are configured to coalesce oil captured by engagement with said plates of the air-oil mixture flowing from said inlet toward said outlet.

4. The apparatus of claim 1, further comprising:
   a reservoir in fluid communication with said plates and positioned to receive fluid coalesced by said plates.

5. The apparatus of claim 4, wherein said plates include a plurality of ports for directing liquid coalesced by said plates into said reservoir.

6. The apparatus of claim 4, wherein said enclosure includes an evacuation port in communication with said reservoir for evacuating liquid from said reservoir.

7. The apparatus of claim 1, wherein said plates are arranged so that the gas-liquid mixture flows over respective surfaces of said plates in a generally sinusoidal flow profile.

8. The apparatus of claim 1, further comprising:
   a plurality of spacers separating pairs of adjacent ones of said plates.

9. The apparatus of claim 1, wherein each of said plates has a generally horizontal orientation along the length of said plate and includes bidirectional corrugations extending along the length of said plate and in a direction transverse to the length of said plate.

10. The apparatus of claim 1, wherein said plates are made of polypropylene.

11. The apparatus of claim 1, wherein each of said plates has an oleophilic surface.

12. The apparatus of claim 1, further comprising:
an air-forcing device in fluid communication with said outlet for drawing the gas-liquid mixture from said inlet to said outlet.

13. The apparatus of claim 1, wherein the side seal is spaced from said one of said sidewalls.

14. The apparatus of claim 13, further comprising:
a vertically-extending barrier proximate said inlet, said side seal cooperating with said barrier to direct flow of the gas-liquid mixture between said plates.

15. The apparatus of claim 13, further comprising:
an undulated baffle engaging said side seal and said sidewall for restricting lateral movement of said plates within said enclosure.

16. The apparatus of claim 13, further comprising:
a pair of side seals contacting said plates and spaced from said sidewalls; and
a pair of front gaskets cooperating with said side seals to direct flow of the gas-liquid mixture between said plates.

17. The apparatus of claim 1, further comprising:
a deflector located proximate said inlet for creating a turbulent flow of the gas-liquid mixture flowing between said inlet and said outlet.

18. A system for providing lubrication to a metal-working operation, comprising:
a first enclosure including a metal-working tool in an interior thereof;
a supply of lubricating gas-liquid mixture in fluid communication with said interior of said first enclosure and configured to direct the gas-liquid mixture toward a working interface of said metal-working tool;
a second enclosure in fluid communication with said first enclosure and having an inlet and an outlet defining a flow path for the gas-liquid mixture flowing from said first enclosure between said inlet and said outlet; and
a plurality of stacked plates in said second enclosure and arranged in the flow path between said inlet and outlet, said plates being configured to coalesce liquid from the gas-liquid mixture contacting said plates.

19. The system of claim 18, further comprising:
a reservoir in said enclosure and in communication with said plates for receiving liquid coalesced by said plates, wherein said reservoir is in fluid communication with said supply of lubricating gas-liquid mixture for recycling liquid collected in said reservoir.

20. A method of separating a liquid from a gas-liquid mixture, the method comprising:
forcing a stream of the gas-liquid mixture into an enclosure having a pair of sidewalls; directing
the stream between a plurality of stacked plates within said enclosure to thereby coalesce liquid from the gas-liquid mixture;
locating a side seal between one of the sidewalls and the plurality of stacked plates and contacting the plurality of stacked plates; and
evacuating substantially liquid-free gas from said enclosure.

21. The method of claim 20, further comprising:
disrupting flow of the gas-liquid mixture entering the enclosure to thereby make the flow thereof turbulent.

22. The method of claim 20, further comprising:
forcing substantially all portions of the stream to flow between the stacked plates.

23. The method of claim 20, further comprising: spacing the side seal from the one of the sidewalls.

* * * * *

UNITED STATES PATENT AND TRADEMARK OFFICE
CERTIFICATE OF CORRECTION

PATENT NO. : 8,419,836 B2  
APPLICATION NO. : 13/020317  
DATED : April 16, 2013  
INVENTOR(S) : Leonard Ardizzone Page 1 of 1

It is certified that error appears in the above-identified patent and that said Letters Patent is hereby corrected as shown below:

In the Claims:

Col. 10, In claim 20, lines 15-19 change:

"forcing a stream of the gas-liquid mixture into an enclosure having a pair of sidewalls; directing the stream between a plurality of stacked plates within said enclosure to thereby coalesce liquid from the gas-liquid mixture;"

to

--forcing a stream of the gas-liquid mixture into an enclosure having a pair of sidewalls;

directing the stream between a plurality of stacked plates within said enclosure to thereby coalesce liquid from the gas-liquid mixture;--.

Signed and Sealed this  
Ninth Day of July, 2013

Teresa Stanek Rea  
*Acting Director of the United States Patent and Trademark Office*